E. FREY.
VARIABLE SPEED TRANSMISSION GEAR.
APPLICATION FILED MAY 8, 1914.

1,177,853.

Patented Apr. 4, 1916.
2 SHEETS—SHEET 1.

Witnesses.
SR N Allen
G. M. Moreland

Ellsworth Frey.
Inventor.
by Fetherstonhaugh
his Attorneys.

E. FREY.
VARIABLE SPEED TRANSMISSION GEAR.
APPLICATION FILED MAY 8, 1914.
1,177,853.
Patented Apr. 4, 1916.
2 SHEETS—SHEET 2.
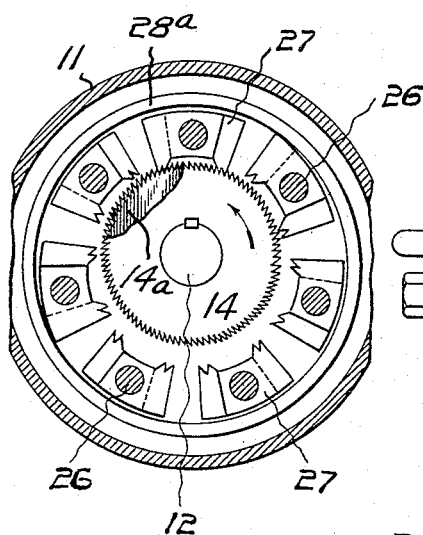
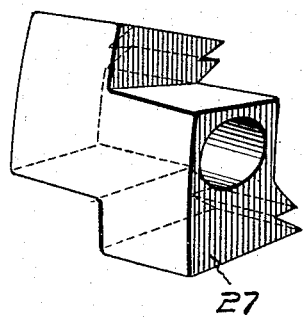
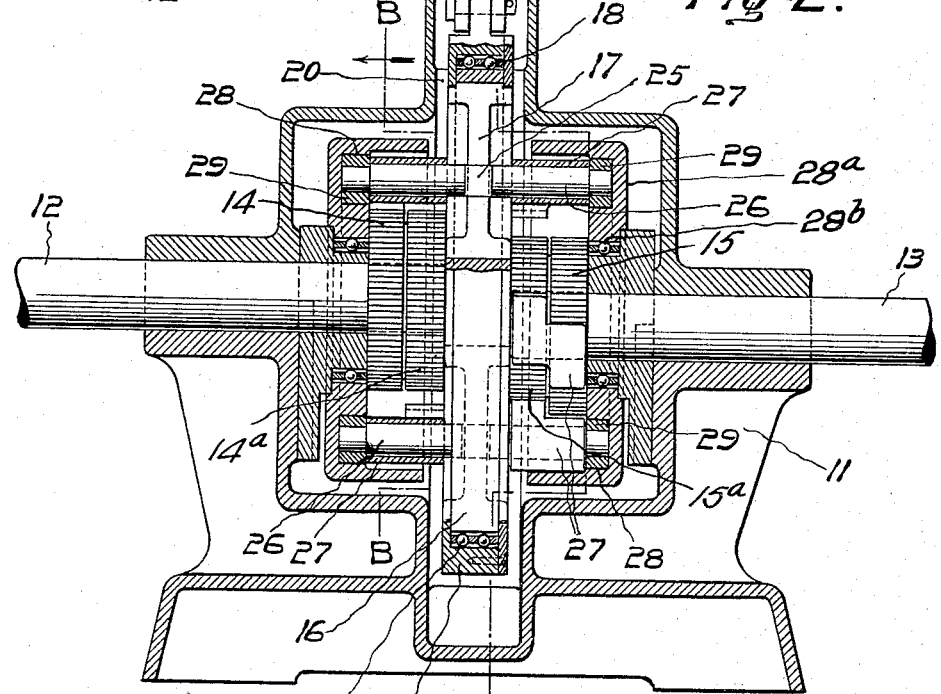
Witnesses.
Ellsworth Frey.
Inventor.
by
his Attorneys.

UNITED STATES PATENT OFFICE.

ELLSWORTH FREY, OF SPRINGFIELD, MASSACHUSETTS.

VARIABLE-SPEED-TRANSMISSION GEAR.

1,177,853.  Specification of Letters Patent.  Patented Apr. 4, 1916.

Application filed May 8, 1914. Serial No. 837,240.

*To all whom it may concern:*

Be it known that I, ELLSWORTH FREY, a citizen of the United States of America, and resident of the city of Springfield, in the State of Massachusetts, United States of America, have invented certain new and useful Improvements in Variable-Speed-Transmission Gear, of which the following is a full, clear, and exact description.

This invention relates to improvements in variable speed transmission gears, and the primary object is to provide a gear having an infinite number of speed rates.

A further object is to provide a gear so constructed that the same may be shifted to change from one speed to another without any interruption to the delivery of power.

A still further object is to provide a gear which will operate in either direction with the same efficiency.

Another object is to provide a particularly strong and compact gear which will not be liable to disarrangement or break down.

The device consists essentially of a pair of shafts arranged end to end and each provided with a pair of gears. Mounted between the ends of the shafts is a radially slotted disk having pins passing through the slots thereof, carrying on their opposite ends gear sectors meshing with the shaft gears. The ends of these pins travel in fixed channels, which operate to throw the sectors into and out of mesh with the gears. Shifting means are provided for the central disk whereby the sectors may be moved toward or away from each other, thereby regulating the relative duration of their engagement with the gears.

Figure 5:
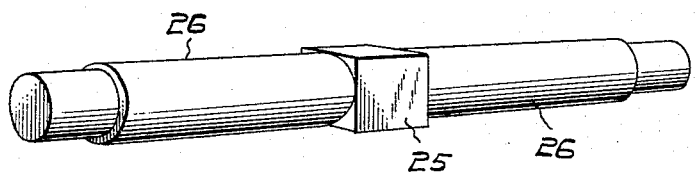
Figure 1:
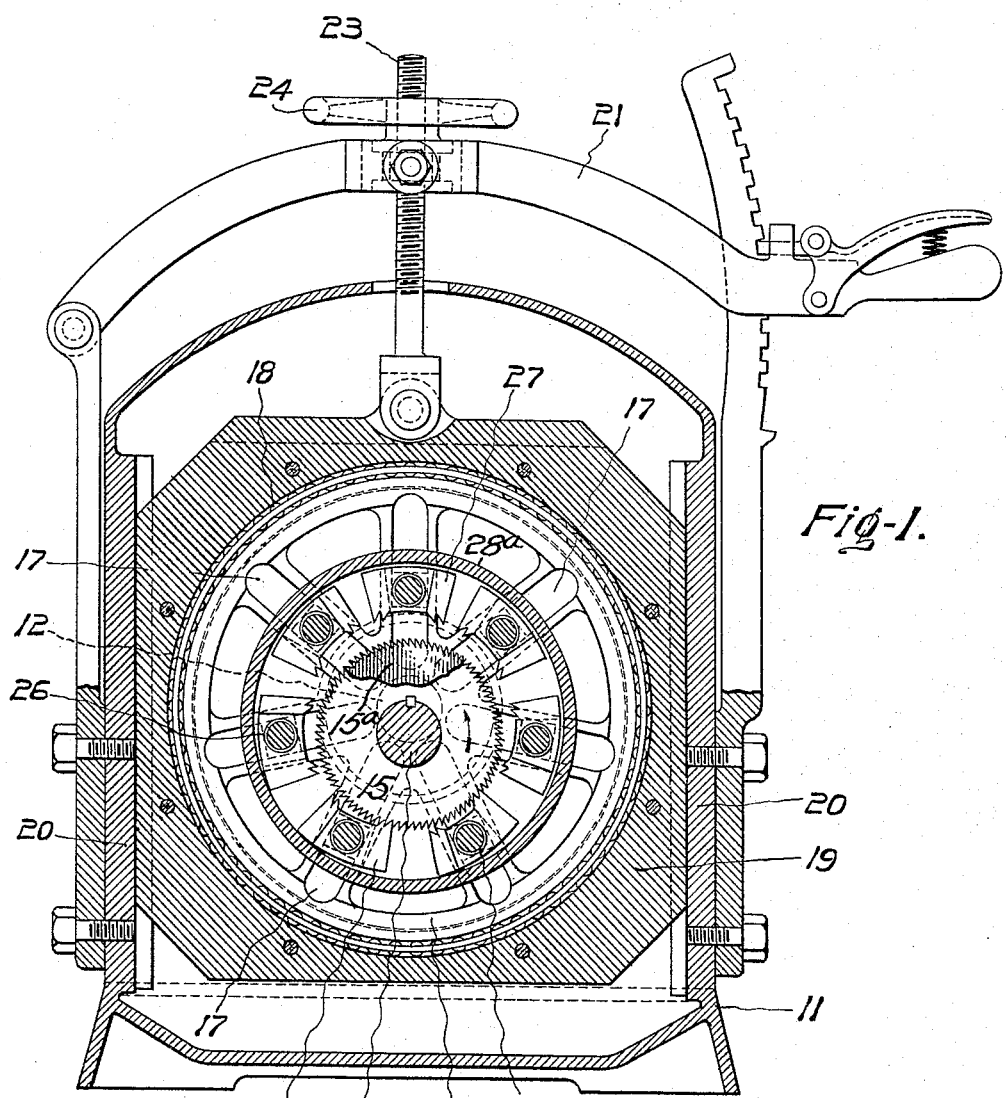

In the drawings which illustrate the invention:—Figure 1 is a vertical sectional view of the device on the line A—A, Fig. 2. Fig. 2 is a vertical sectional view of the device in the plane of the shaft axis. Fig. 3 is a section on the line B—B, Fig. 2. Fig. 4 is a perspective view of one of the sectors. Fig. 5 is a perspective view of one of the sector carrying pins.

Referring more particularly to the drawings, 11 designates a fixed framework in which are journaled two shafts 12 and 13 arranged end to end, axially parallel but slightly eccentric, as clearly shown. One of these shafts 12 may be connected with any suitable source of power, and will hereafter be termed the driving shaft, while the other shaft 13, to which may be connected any suitable machine or the propeller shaft of a boat or automobile, will be hereafter termed the driven shaft. These shafts are provided with fixed gears 14, $14^a$, 15, $15^a$ respectively, the gears 14, 15 being for driving in a forward direction and the gears $14^a$, $15^a$ for driving in a reverse direction. It will be noted that the gears are shown as provided with ratchet teeth, but this is not in all cases necessary.

Between the ends of the shafts a disk 16 is provided having radial slots 17. This disk is mounted by means of ball bearings 18 in a plate 19 slidable in a fixed frame or yoke 20. A lever 21 is provided by means of which the disk may be moved into position concentric with either shaft or to any suitable point between or beyond the shafts. As the number of speed ratios would be limited to the number of teeth in the quadrant engaged by the lever, an adjusting device is provided between the plate 19 and lever, so that the most minute variations of speed may be obtained. This adjusting means comprises a threaded shaft 23 fixed to the plate 19, passing through the lever 21 and provided with an internally threaded hand wheel 24.

A block 25 is slidably mounted in each of the disk slots 17, each block having a pin 26 projecting at each end beyond the disk 16 a suitable distance. Each end of each pin is provided with a revolubly mounted gear sector 27 having teeth at each end thereof formed to engage either of the shaft gears, but not both at once. These sectors are formed as shown in the drawings with one-half the width of the teeth cut away at each end, the cut away portions being on opposite sides, so that one end of a sector may engage for example the gear 14 and at the opposite end the gear $14^a$. The ends of the pins project into circular grooves 28 formed in the frame or in the disks $28^a$, the ends of the pins being provided if desired with shoes 29, which run in the slots. The disks may be fixed or revoluble on bearings $28^b$, and the pins fixed thereto. In certain types of gear, these shoes may be formed integral with the gear sectors, so as to positively move the sectors about the pins into and out of engagement with the shaft gears.

The principle upon which the gear operates is extremely simple, and will be readily understood. The grooves 28 or disks 28ª are preferably centered in a line midway between and parallel with the shaft centers. If the disk 16 is centered in this line, it is obvious that the pins will all be equidistant from the center of the disk and the sectors of one side engaging the tops of one shaft gear and on the other side engaging the bottom of the other shaft gear. The rotation of the driving shaft is communicated through the sector engaging its gears 14 or 14ª, the disk and the sectors engaging the gears 15 or 15ª to the driven shaft 13, the sectors on each side being equidistant from the center of the disk and the center of the grooves 28 will engage or disengage the gears simultaneously, and travel during engagement through arcs of exactly the same length, so that the driven shaft will revolve at the same speed as the driving shaft. If, however, the plate 19 is moved up or down, the pins carrying the sectors and engaging at their ends in the fixed grooves, occupy positions nearer the disk center on one side and farther away on the opposite side. Thus, pins nearer the disk center will also be nearer to one another than the pins more remote from the disk center. Thus, if the driving shaft gears engage the more separated sectors and carry them and the disk through a given angle, it is obvious that the arc of travel of the sectors on the opposite side of the disk in engagement with the gears of the driven shaft will be shorter, although subtended by an equal angle. Thus, the driven shaft will revolve more slowly than the driving shaft. If the plate and disk be moved in the opposite direction, the sectors engaging the driving shaft gears will have shorter travel than the sectors engaging the driven shaft gears, so that the driven shaft will revolve at greater speed than the driving shaft. The fixed grooves keep the sectors invariably traveling in the same circular path, while the movement of the disk regulates the arc of travel on opposite sides of the center for equal angles. In the form shown, the engagement of the sectors and gears is effected by the eccentric relation of the gears and grooves 28. The relation between the grooves 28 controlling the path of the sectors and the diameter of the gears, and the number of slots 17 in the disk 16, is such that at no position within the limits of adjustment of the disk will there be any gap between the disengagement of one sector and the engagement of another with any gear, so that the motion is absolutely smooth and regular. At the maximum adjustment for either high or low speed, that is, when the sectors at one side of the center are at the ends of the slots and at the other side of the center are close to the center, the engagement and disengagement of the sectors at the ends of the slots with the shaft gear will be simultaneous, while on the opposite side of the center, the periods of engagement will overlap very considerably.

It is obviously possible to produce an operative gear with the shafts co-axial and the grooves 28 eccentric thereto, without departing from the spirit of the invention. The shafts may also be provided each with only a single gear, in which case the device will operate in one direction only or by providing special means for controlling the inclination of the sectors, gears may be used with ordinary teeth. The form shown in the drawings is, however, preferred as being better from a mechanical point of view. It will also be understood that a number of minor changes may be made in the particular construction and arrangement of parts, so that nothing in the foregoing description must be taken as limitative, but merely as descriptive of the principle of providing sectors having variable arcs of travel for equal angles of revolution forming the connection between a driving and a driven shaft.

Having thus described my invention, what I claim is:—

1. In a device of the character described comprising a pair of shafts, gears fixed thereon, a radially slotted disk, pins passing through the slots of said disk, sectors mounted on said pins in the disk engaging said gears, and means for regulating the arc of travel of said sectors for equal angles of rotation.

2. In a device of the character described, the combination with a driving and a driven shaft of gears rigidly mounted thereon, sectors engageable with said gears and forming a driving connection between said shafts, means causing said sectors to travel in a path eccentric to both shafts, a revoluble radially slotted disk supporting said sectors in the slots thereof, and means for moving said disk into and out of concentric relation with both of said shafts.

3. A device of the character described, comprising the combination with a driving and a driven shaft, gears rigidly mounted on said shafts, a radially slotted revoluble disk, means for regulating the eccentricity of said disk with respect to the shafts, pins passing through the slots of said disk, sectors on opposite ends of each pin engageable with said gears, and means causing said pins and the sectors thereon to travel in a path eccentric to both shafts.

4. A device of the character described, comprising a driving and a driven shaft arranged end to end, gears rigidly mounted on said shafts, a radially slotted revoluble disk between said gears, pins passing through the slots of said disk parallel with the shafts and slidable toward and away from the disk center, gear sectors revolubly mounted on the ends of said pins and engageable with the driving and driven gears, circular grooved tracks for said pins arranged eccentric to both shafts, and means for shifting the disk in a plane perpendicular to the axes of the shafts.

5. A device of the character described, comprising a driving and a driven shaft arranged end to end parallel and axially eccentric, gears fixed to adjacent ends of said shafts, a radially slotted disk mounted between said gears and entirely separate therefrom, pins passing through the slots of said disk and slidable toward and away from the center thereof, gear sectors revolubly mounted on the ends of said pins and engageable with said gears, a circular track controlling the path of said pins and sectors carried thereby, and means for relatively moving said disk and track into and out of concentric position.

6. A device of the character described, comprising a driving and a driven shaft arranged end to end, parallel and axially eccentric, gears rigidly mounted on the adjacent ends of said shafts, a framework in which the shafts are journaled having circular grooves therein arranged axially concentric, the axes of said grooves being midway between the axes of the shafts, pins parallel with the shafts traveling in said grooves, revoluble gear sectors on said pins engageable simultaneously with the driving and driven gears on opposite sides of the groove axes, a disk between said gears radially slotted for the passage of said pins, and means for moving said disk into and out of concentric relation with said shafts and grooves.

7. A device of the character described, comprising a driving and a driven shaft, a pair of ratchet toothed gears rigidly mounted on each shaft, the gears on each shaft having the teeth thereof oppositely faced, a radially slotted disk, pins in the slots of said disk, a gear sector on each end of each pin, the sector on one end of each pin being engageable with the driving gears and on the opposite end with the driven gears, said sectors having on opposite ends thereof oppositely facing teeth engageable only with the gear having corresponding teeth, means for moving said sectors into and out of mesh with the gears, and means for regulating the engagement and disengagement of said sectors with relation to one another and to the driving and driven gears.

In witness whereof, I have hereunto set my hand in the presence of two witnesses.

ELLSWORTH FREY.

Witnesses:
 CHARLES J. WESTON,
 MAXINE O. FREINES.

Copies of this patent may be obtained for five cents each, by addressing the "Commissioner of Patents, Washington, D. C."